(12) United States Patent
Chen et al.

(10) Patent No.: US 10,223,241 B2
(45) Date of Patent: Mar. 5, 2019

(54) RESUMING A REMOTE DEBUGGING SESSION USING A BACKUP NODE

(71) Applicant: International Business Machines Corporation, Armonk, NY (US)

(72) Inventors: Xiao Ling Chen, Beijing (CN); Chuan He, Beijing (CN); Yan Huang, Beijing (CN); Jiang Yi Liu, Beijing (CN); Wu Wei, Beijing (CN); Jian Xu, Milton (CA); Chong Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 15/447,586

(22) Filed: Mar. 2, 2017

(65) Prior Publication Data

US 2018/0253371 A1 Sep. 6, 2018

(51) Int. Cl.
*G06F 11/16* (2006.01)
*G06F 11/20* (2006.01)
(Continued)

(52) U.S. Cl.
CPC ...... *G06F 11/3664* (2013.01); *G06F 11/1658* (2013.01); *G06F 11/1675* (2013.01);
(Continued)

(58) Field of Classification Search
CPC .. G06F 11/1675; G06F 11/20; G06F 11/2002; G06F 11/2005; G06F 11/1658; G06F 11/22; G06F 11/2205; G06F 11/2294; G06F 11/273; G06F 11/3006; G06F 11/3664
See application file for complete search history.

(56) References Cited

U.S. PATENT DOCUMENTS 7,673,180 B1 3/2010 Chen et al.
8,656,360 B2 2/2014 Bates
(Continued)

OTHER PUBLICATIONS

Tufekci Mert et al., "Extending Cloudstudio With Collaborative Remote Debugger", Politesi Digitial Archive of PhD and post graduate theses, Dec. 2012, 3 pages.

*Primary Examiner* — Paul Contino
(74) *Attorney, Agent, or Firm* — Cantor Colburn LLP; William A. Kinnaman, Jr.

(57) ABSTRACT

Aspects include detecting, by an agent of a remote debugging tool that a first controller currently associated with the agent for a debugging session has not responded to a status inquiry from the agent. The first controller interacts with an end user, sends requests to the agent to operate a target program, and processes responses from the agent. Based on detecting that the first controller has not responded to the status inquiry from the agent, the agent identifies a second controller, associates the second controller with the agent for the debugging session, and resumes the debugging session with the second controller in place of the first controller. The associating includes synchronizing a debugging session state between the second controller and the agent. The target program continues to execute during the identifying, associating, and resuming, and the debugging session state is not changed by the identifying, associating, and resuming.

20 Claims, 7 Drawing Sheets

(51) Int. Cl.
*G06F 11/22* (2006.01)
*G06F 11/30* (2006.01)
*G06F 11/36* (2006.01)
*G06F 11/273* (2006.01)

(52) U.S. Cl.
CPC .......... *G06F 11/20* (2013.01); *G06F 11/2002* (2013.01); *G06F 11/2005* (2013.01); *G06F 11/22* (2013.01); *G06F 11/2205* (2013.01); *G06F 11/2294* (2013.01); *G06F 11/273* (2013.01); *G06F 11/3006* (2013.01); *G06F 11/3632* (2013.01)

(56) References Cited

U.S. PATENT DOCUMENTS

| | | |
|---|---|---|
| 9,448,914 B2 | 9/2016 | Li et al. |
| 9,898,384 B2* | 2/2018 | Chan ................... G06F 11/3644 |
| 2010/0057865 A1 | 3/2010 | Chan et al. |
| 2013/0262930 A1* | 10/2013 | Nakamura .......... G06F 11/3664 |
| | | 714/27 |
| 2015/0193328 A1 | 7/2015 | Deakin et al. |
| 2016/0162322 A1 | 6/2016 | Wu et al. |
| 2018/0121324 A1* | 5/2018 | Tucker ................ G06F 11/3636 |
| 2018/0129584 A1* | 5/2018 | Somasundaram .. G06F 11/3664 |

* cited by examiner

RESUMING A REMOTE DEBUGGING SESSION USING A BACKUP NODE

BACKGROUND

This disclosure relates generally to remote debugging of computer programs, and more specifically, to resuming a remote debugging session using a backup node.

SUMMARY

According to embodiments, a method, system, and computer program product are provided. A method includes detecting, by an agent of a remote debugging tool that a first controller currently associated with the agent for a debugging session has not responded to a status inquiry from the agent. The first controller interacts with an end user, sends requests to the agent to operate a target program, and processes responses from the agent. The agent and the target program execute on the same node, the agent controls operation of the target program and the agent executes commands according to the requests from the first controller and sends the responses to the first controller. The method also includes performing by the agent, based on detecting that the first controller has not responded to the status inquiry from the agent: identifying a second controller; associating the second controller with the agent for the debugging session, the associating including synchronizing a debugging session state between the second controller and the agent; and resuming the debugging session with the second controller in place of the first controller. The target program continues to execute during the performing and the debugging session state is not changed by the performing.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
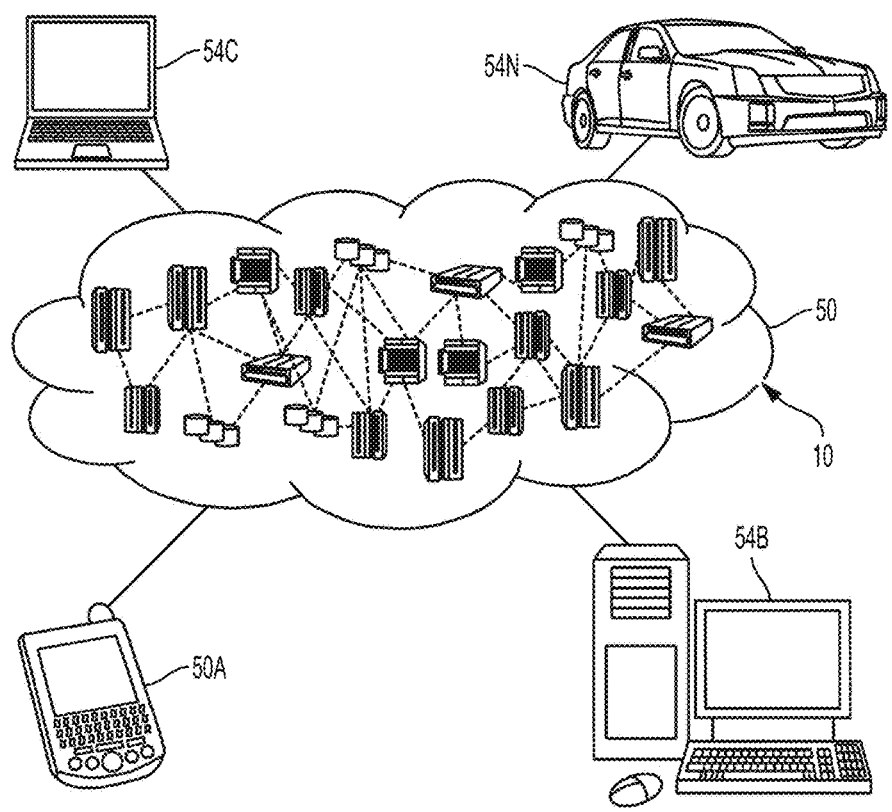
FIG. 1 depicts a cloud computing environment in accordance with one or more embodiments.

One or more embodiments described herein provide a remote debugging tool for use in a computing environment that has multiple processing nodes. The debugging of a target program can be performed by the remote debugging tool starting execution of a debugging session on a first processing node and completing execution on a second processing node. This can occur without any required action by or notification to the end user of the remote debugging tool. That is, the movement of the execution of the debug controller from one node to another node is performed automatically based on certain criteria being met, and the switch can be transparent, or hidden, from the end user. In accordance with one or more embodiments, the transfer is transparent to the end user even when debug processing at the first node is terminated unexpectedly.

This type of debugging, where the debugger and the program being debugged are executing on different nodes in a network is referred to herein as "remote debugging." A remote debugging tool generally has two components: a debug controller (also referred to herein as a "debug service") executing on a first node, and a debug agent executing on a second node along with (e.g., by the same operating system) the target program that is being debugged. A debugging session includes state data that is maintained between the debug controller and the debug agent, and they cooperate according to specified protocols and principles. In accordance with one or more embodiments, the debug agent determines whether the debug controller portion of a debug session should be moved to another node, and can execute computer instructions to initiate moving the debug controller and resume execution of the debugging session using a debug controller located on the other node. As used herein, the term "debugging session" refers to the network connection between the controller and the agent to execute debugging and can be implemented using protocols such as, but not limited to: execution and program data control (EPDC) and remote method invocation (RMI).

In accordance with one or more embodiments, a remote debugging tool is provided that allows different debug controllers to resume each other's work in a seamless manner. The debugging described herein can be provided as Debug as a Service (DaaS) in a cloud environment, which can result in a higher quality of service (QoS) and save user time and cost when compared to traditional debug methods. In accordance with one or more embodiments, when a first debug controller is debugging a target program, it stores data related to the current state of the debug session and makes the debug session state available to at least one other debug controller and/or the debug agent. The debug agent can also manage and store debug session state data (e.g., the address of the controller, the history of requests and replies with a time stamp, content of the requests and replies, etc.) at the node where the debug agent and target program are executing. When the debug agent detects that the first debug controller cannot continue debugging, the agent ensures that the target program stays in the current status and requests that the debug session continues with another debug controller (e.g., a second debug controller). Debug session state data is compared and synchronized between the second debug controller and the debug agent, and based on the result of the synchronizing, the debug agent and the second debug controller compute a best point to resume the debugging session.

In accordance with one or more embodiments, decisions about whether to move a debug controller in a debug session to a new node and actually executing the move are driven by debug agents of the remote debugging tool. As described herein, a debug agent determines if a debug session needs to be changed to include a debug controller on a different node due, for example, to the node or the current debug controller being unavailable. In accordance with one or more embodiments, the change of debug controller occurs while the debug agent and target program continue to execute, and the debugging session state is maintained. This allows the debugging work to be resumed on a debug controller on a new node in a non-disruptive fashion. Since in a cloud environment, a controller is often referred to as a service, the terms "service" and "controller" are used interchangeably herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
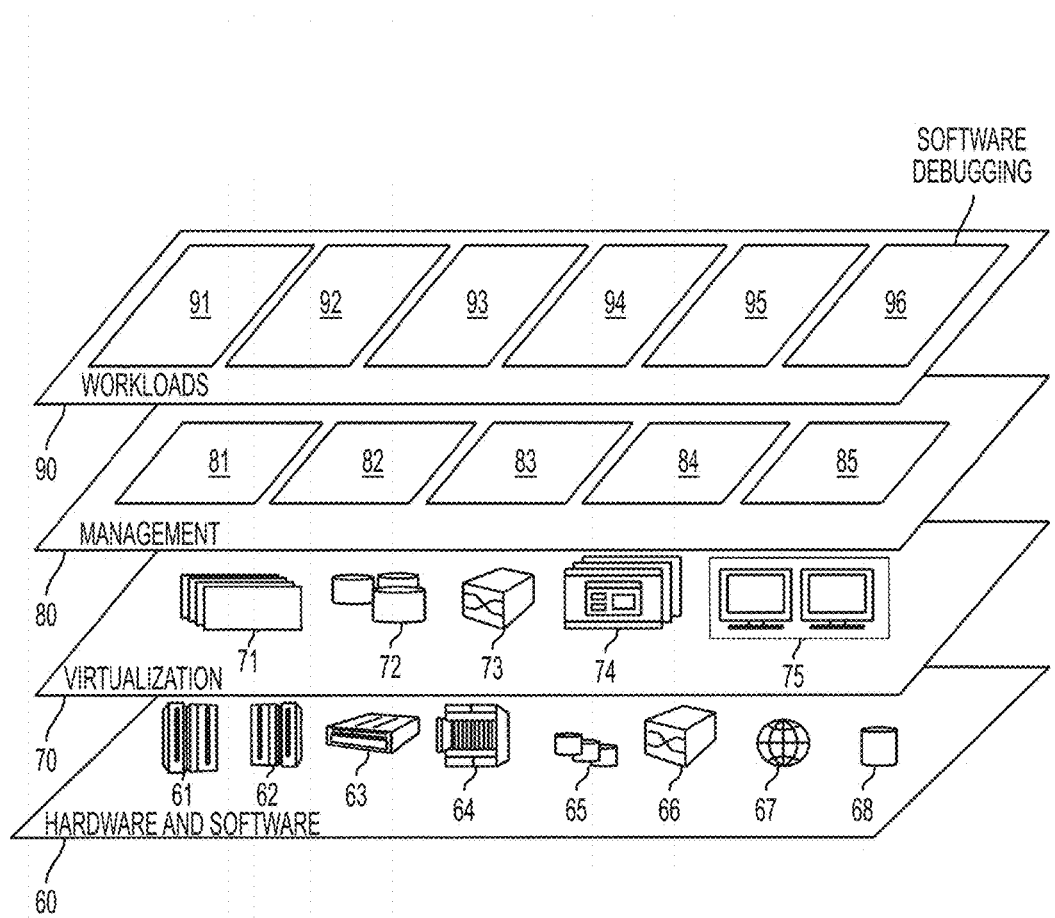
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software debugging 96.

Figure 3:
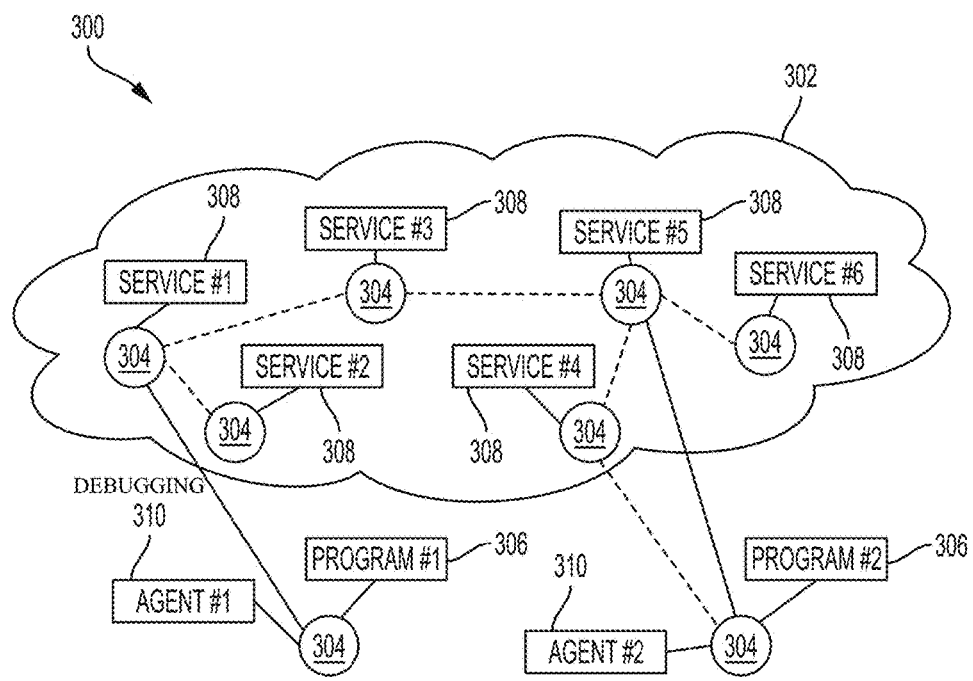
FIG. 3 depicts a computing environment for providing remote debugging in accordance with one or more embodiments.

Turning now to FIG. 3, a computing environment 300 for providing a remote debugging tool is generally shown in accordance with one or more embodiments. The computing environment 300 shown in FIG. 3 includes a network 302 (e.g., a cloud network) that includes a plurality of nodes 304. As used herein, the term "node" refers to a processing device such as, but not limited to: a mainframe computer, a personal computer, or a cell phone. Each node 304 has a unique network address, such as a data link control (DLC) address or a media access control (MAC) address. In accordance with one or more embodiments, the nodes 304 can be physical nodes or virtual nodes. Each node 304 within the network 302 shown in FIG. 3 has a corresponding debug service 308 (also referred to herein as a "debug controller" or "controller") that can be executed at the node 304. FIG. 3 also depicts nodes 304 outside of the network 302 that each can execute a target program 306 being debugged as well as a debug agent 310. As shown in FIG. 3, there are multiple debug services 308 (labeled "Service #1", "Service #2", "Service #3", "Service #4", "Service #5", and "Service #6") each configured to run on different nodes 304 in the network 302. As shown by the dashed lines between them in FIG. 3, the debug services 308 are able to communicate with each other through the network 302. Also as shown in FIG. 3, the debug agents 310 (labeled "Agent #1" and "Agent #2") run on the same nodes 304 as their corresponding target programs 306 (labeled "Program #1" and "Program #2"). As shown by the solid lines in FIG. 3, debugging sessions can be initiated between the debug services 308 and the debug agents 310 to allow them to communicate and cooperate according to some protocol and principles (e.g., EPDC, RMI).

Each debug agent 310 is able to control operation of its corresponding target program 306, and can communicate with its corresponding debug service 308 via a debugging session. As shown in FIG. 3, the debug agent 310 labeled "Agent #1" controls the debugging of the target program 306 labeled "Program #1" and is currently in a debug session with the debug service 308 labeled "Service #1." Also as shown in FIG. 3, the debug agent 310 labeled "Agent #2" controls the debugging of the target program 306 labeled "Program #2" and is currently in a debug session with the debug service 308 labeled "Service #5." Not shown in FIG. 3, is the end user(s) that is accessing the debug services 308 via, for example a graphical user interface (GUI) of the remote debugging tool to guide the debugging processes.

Figure 4:
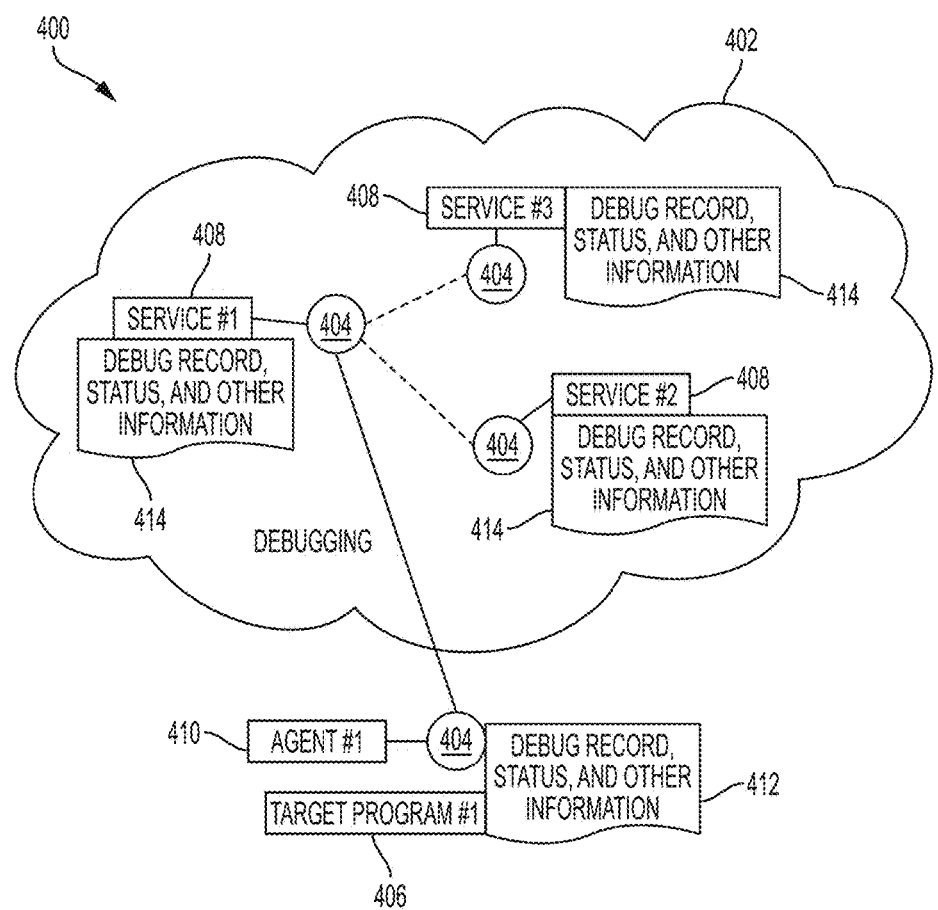
FIG. 4 depicts a computing environment where data is synchronized between remote debug controllers in accordance with one or more embodiments.

Turning now to FIG. 4, a computing environment 400 where debug session state data is synchronized between remote debug controllers is generally shown in accordance with one or more embodiments. The computing environment 400 shown in FIG. 4 includes a network 402 that includes a plurality of nodes 404. Each node 404 within the network 402 shown in FIG. 4 has a corresponding debug service 408 that can be executed by the node 404. FIG. 4 also depicts a node 404 that is outside of the network 402 that has a corresponding target program 406 for debugging as well as debug agent 410, both of which can be executed by the corresponding node 404. As shown in FIG. 4, there are multiple debug services 408 (labeled "Service #1", "Service #2", and "Service #3") each running on different nodes 404 in the network 402. As shown by the dashed lines between them in FIG. 4, the debug services 408 are able to communicate with each other through the network 402. Also as shown in FIG. 4, the debug agent 410 (labeled "Agent #1") runs on the same node 404 as the target program 406 (labeled "Target Program #1"). As shown by the solid line in FIG. 4, the debug service 308 labeled "Service #1" and the debug agent 410 labeled "Agent #1" communicate via a debugging session and cooperate according to some protocol and principles. Not shown in FIG. 4, is the end user(s) that is accessing the debug services 408 via, for example a graphical user interface (GUI) of the remote debugging tool to guide the debugging processes.

Also shown in FIG. 4 is controller debug session state data 414 and agent debug session state data 412 that captures a current state of a remote debugging session. The controller debug session state data 414 and the agent debug session state data 412 can be used to move a debug session from a current debug service executing on one node to a backup debug service executing on another node. As shown in FIG. 4, copies of the controller debug session state data 414 are located on both of the other nodes 404 in the network 402. The debug session state data can be stored anywhere, however it must be accessible by the debug agent 410 and its selected backup debug service (i.e., the debug service that the remote debugging process is moving to). In one or more embodiments, the controller debug session state data 414 and the agent debug session state data 412 have the same contents. In one or more other embodiments the contents of the debug data on the controller and the debug agent 410 are not the same, however, the combination of data on the two sides is complete and sufficient to execute the debugging. The controller and the debug agent 410 can request data from each other.

The debug session state data can include, but is not limited to: configuration data, request and reply records, code files, disassembly code, break point list, variable values, environment variable values, machine status (registers, PC, PSW, etc.), history, context, debug information, and basic information of the target program 406. In accordance with one more embodiments, both the agent debug session state data 412 and the controller debug session state data 414 include configuration data, basic information of the target program 406, request and reply record timestamps, contents of the request and reply records, break point list, variable values, and machine status. Information not related to execution status of the target program, such as code files, disassembly code, and basic information of the target program 406 may be kept on only one side (i.e., in the agent debug session state data 412 or the controller debug session state data 414). The debug service 408, when executing the debugging of the target program 406 logs that state data required to seamlessly transition the debug session from communicating with the currently executing debug service 408 to communicating with one of its designated backup debug services 408 on another node. In accordance with one or more embodiments, the required data can include configuration data, request and reply records, code files, disassembly code, break point list, variable values, environment variable values, machine status (registers, PC, PSW, etc.), debug information, and basic information of the target program 406.

Figure 5:
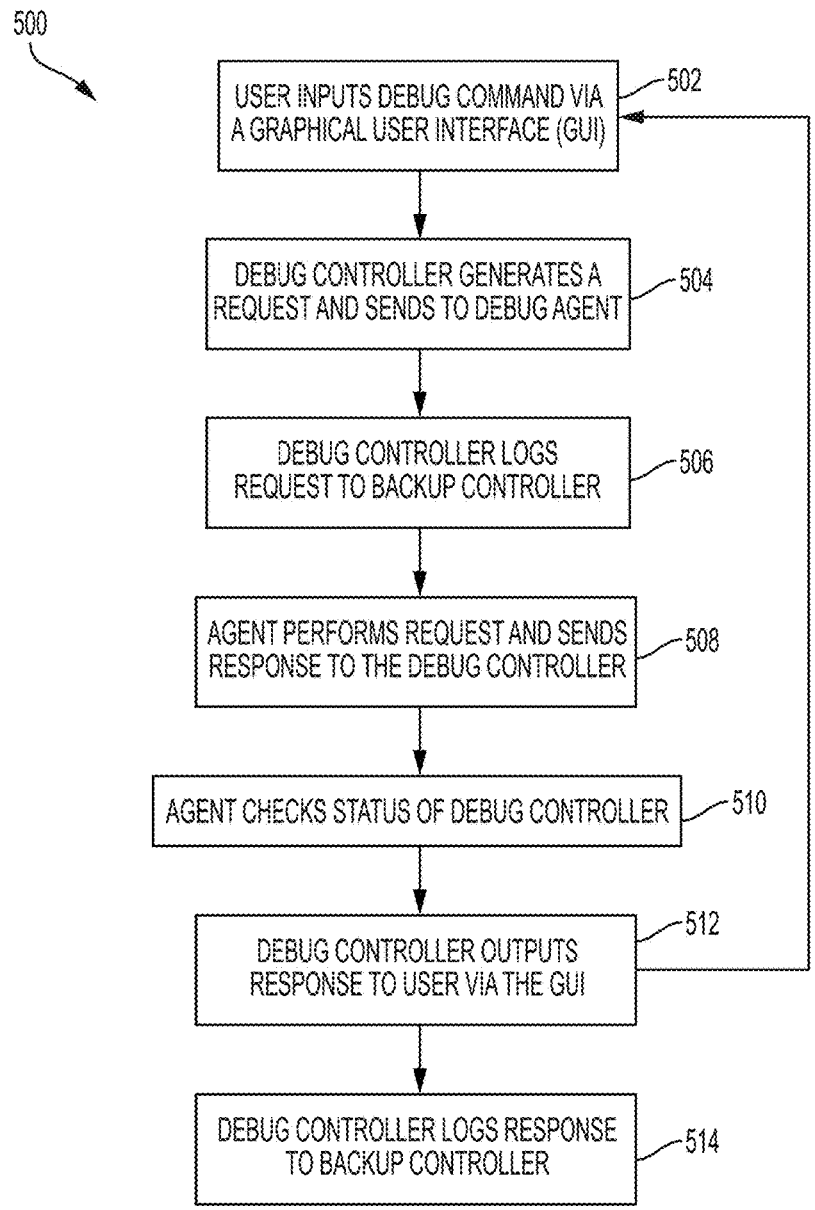
FIG. 5 depicts a process flow for providing remote debugging in accordance with one or more embodiments.

Turning now to FIG. 5, a process flow 500 for providing remote debugging by a remote debugging tool is generally shown in accordance with one or more embodiments. As shown in FIG. 5, at block 502 a user enters a debug command (e.g., via a GUI at a terminal that is communicatively coupled to the debug service) for a debugging a target program. Examples, of debug commands include, but are not limited to: clicking "run" or "step in" button, clicking "set breakpoint" in menu, viewing registers window, inputting "set $hexints" command in input box, etc.

At block 504, based on the entered debug command, the debug controller generates a request and sends (e.g., via a debug session) to a debug agent that is executing on the same node as the target program. Examples of requests include, but are not limited to: start the target program; insert a break point at this location in the target program; run the target program; modify the target program; and terminate the target program.

At block 506, the debug controller logs contents of the request in the controller debug session state data for use in transitioning to a new debug controller if requested by the debug agent. In accordance with one or more embodiments, the controller debug session state data is in a location that is accessible to a debug session that has been designated as a backup to the currently executing debug service, as well as to the debug agent. One or more backup debug sessions can be assigned to each debug session with one or more copies of the controller debug session state data stored in a location(s) that is accessible to the designated backups. In accordance with one or more embodiments, any of the debug sessions in a network can be used to backup any of the other debug sessions in the network. In accordance with one or more other embodiments, only a specified debug session(s) can be used to backup each debug session.

At block 508, the debug agent receives the request from the debug service and performs the requested action. The debug agent sends a response back to the requesting debug service. Examples of responses include, but are not limited to: messages containing information such as the serial number of the corresponding request, the return code, the status code, and the data that the controller requested.

In addition, the debug agent can log contents of the request and the response in a copy of the agent debug session state data. At block 510, the debug agent checks the status of the debug service, using for example, the processing described below in reference to FIG. 6. At block 512, the debug service outputs the response from the debug agent to the user via the GUI, and processing continues at block 502 with the user entering another debug command. At block 514, the debug service logs contents of the response in the controller debug session state data. The process shown in FIG. 5 continues until the remote debugging tool is terminated by the user or otherwise ends.

Figure 6:
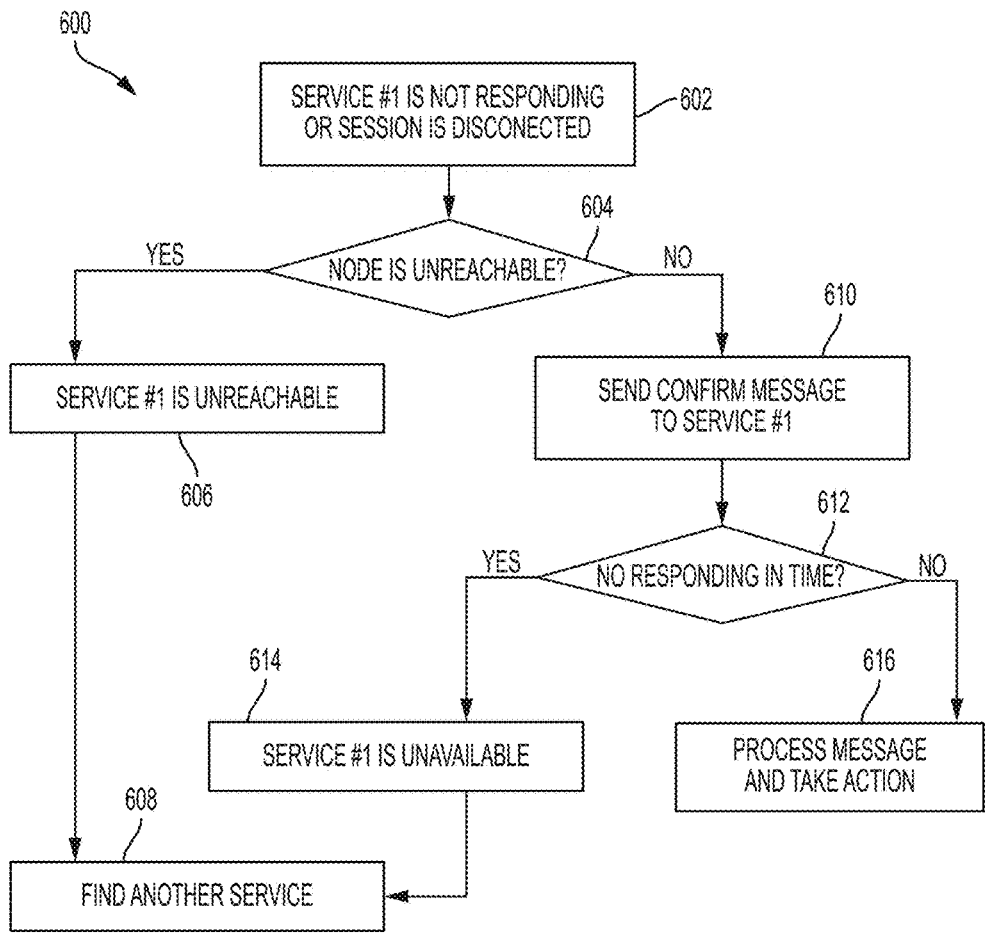
FIG. 6 depicts a process flow performed by a debug agent in accordance with one or more embodiments.

Turning now to FIG. 6, a process flow 600 performed by a debug agent is generally shown in accordance with one or more embodiments. At block 602, the debug agent detects that a previously active debug session between the debug agent and a debug service is no longer active. This could be due to the debug service not responding to the debug agent and/or due to the debug session between the debug agent and the debug service being disconnected. Referring to FIG. 4, in accordance with one or more embodiments, the debug agent can be implemented by debug agent 410, the debug service by debug service 408 labeled "Session #1", and the target program by target program 406. Referring back to FIG. 6, the debug agent can confirm the likely cause of the service disconnection by determining whether the node where the debug service, or debug controller, is executing is unreachable by the debug agent. If the node is unreachable, then the service disconnection was likely caused by a network problem, and the debug agent will stop trying to communicate to the debug service via the debug session. Processing continues at block 606 where it is determined that the debug service in unreachable, and at block 608, the debug agent finds another debug service. In accordance with one or more embodiments, the debug agent selects a backup debug service and initiates moving the current debugging session to the backup debug service.

If the network is working, as determined at block 604, then processing continues at block 610 with the debug agent sending a confirmation message to the debug service. In the embodiment, shown in FIG. 6, the debug agent can have a timeout agreement with the debug service, such as if the target program runs for a long time before the debug agent gets control, there will be no timeout for the debug service. If during the time interval, the debug agent received a request or heartbeat message from the debug service, it will reset the timeout counter. If it is determined at block 612, that there is no response within the time interval, processing continues at block 614 where the debug agent determines that the debug service is unavailable and takes an action, such as finding another debug service at block 608. The debug agent can also have a checking mechanism on the debugging session. If it finds that the debugging session is disconnected, it can take an action when it gets control back. It can process the target programs status and organize/save debugging data, such as controller debug session state data 414 to ensure that the target program will not be affected by the fact that the debugging session failed. If it is determined at block 612, that the debug service responded within a selected specified time to the confirmation message (i.e., that the debug service is currently working), then processing continues at block 616 and the debug agent continues to perform the debugging process of the target program with the current debug service.

In accordance with one or more embodiments, at block 608 the debug agent chooses another debug service due to the current debug service being unreachable or unavailable. The debug agent can search a list of backup debug services, for example in a configured service list, and choose another debug service according to preference rules of the debug agent. For example, the debug agent can select debug service "Service #2" because it has a highest mark on performance and/or a shortest access path. The debug agent sends a message to debug service "Service #2" to request a new debug session. If the request is rejected or no response is received, the debug agent can send a message to another debug service and so on until a backup debug service that can take the job is located. The backup debug service can indicate to the debug agent that it can participate in the debugging session by requesting debut session state comparison information from the debug agent.

The debug agent can respond by initiating the debugging session, while the target program is still executing, with the backup debug service and sending all or a subset of the agent debug session state data to the backup debug service. The backup debug service can compare this data to contents of the controller debug session state data. If the contents match, then the session state data comparing is successful and the debugging process is ready to proceed with the backup debug service. Referring back to FIG. 4, the debug service 408 labeled "Service #3" may be the selected backup debug service, and the debugging process will proceed with the debug agent 410 in a debugging session with the debug service 408 labeled "Service #3" being used to debug the target program 406. If the contents don't match, then the information in the controller debug session state data may be newer than the information in the agent debug session state data. This can occur if the debug service sent a request that the debug agent didn't receive. In this case, the backup debug service can send the request again, and the debugging process will proceed with the backup debug service. Alternatively, if the contents don't match, the information in the agent debug session state data may be newer than the information in the controller debug session state data. This can occur if the debug agent sent a reply to a request that was never received by the debug server. In this case, the agent has the record of the reply (e.g. in its agent debug session state data) that it will resend to the backup debug service. If the backup debug service has just the record of request number N-M, then the debug agent will send the record of M requests and M replies to the backup debug service, and can additionally send a newer break point list, variable values, and a machine state to the backup debug service as well. The backup debug service can send a confirmation to the debug agent after all of the information is processed successfully.

In accordance with one or more embodiments, all of the data that is needed to move from one debug service to a backup debug service is stored as agent debug session state data. When the debugging session with the debug agent is changed communicating with the debug service to communicating with the backup debug service, the debug agent sends all of the data to the backup debug service. In accordance with one or more other embodiments, all of the data that is needed to move from one debug service to a backup debug service is stored as controller debug session state data. A benefit to this configuration is that if the agent side is not working properly, a debug service can terminate the session, choose another agent, and perform the previous debugging history automatically. Other configurations where a selected subset of data is stored on one or both of the agent and service side can also be implemented by one or more embodiments.

Figure 7:
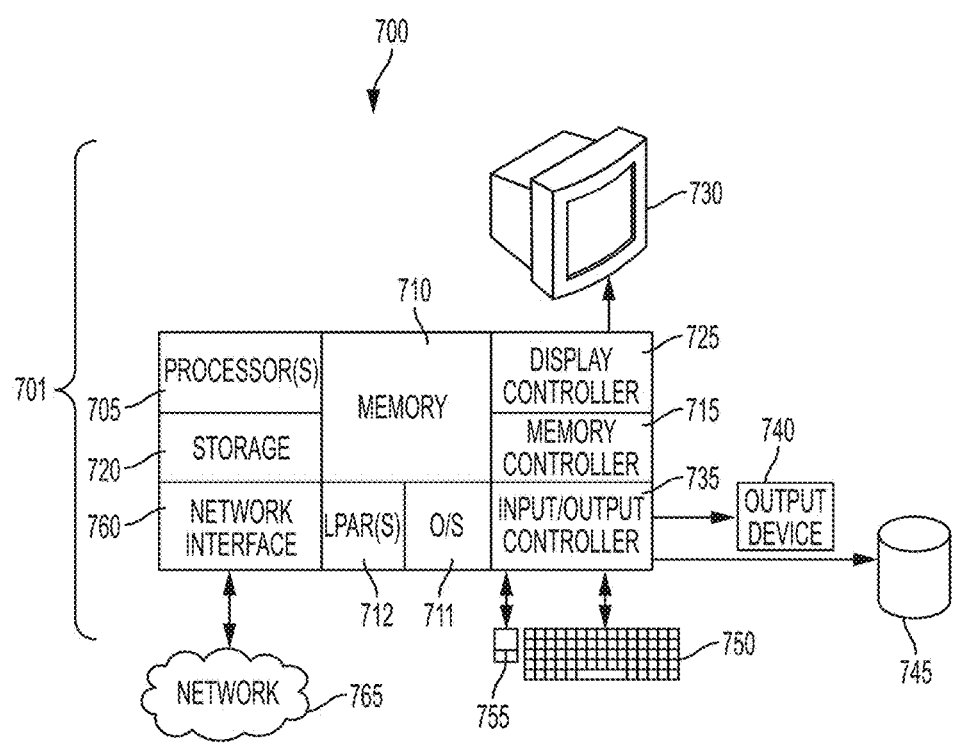
FIG. 7 depicts a block diagram of a computer system for implementing aspects of the system in accordance with one or more embodiments.

Turning now to FIG. 7, a block diagram of a computer system for resuming a remote debugging session using a backup node is generally shown according to one or more embodiments. In accordance with one or more embodiments the processing described herein is performed by a processor located on a memory controller 715 and the memory devices are contained in a memory 710. The methods described herein can be implemented in hardware, software (e.g., firmware), or a combination thereof. In an exemplary embodiment, the methods described herein are implemented in hardware as part of the microprocessor of a special or general-purpose digital computer, such as a memory controller or mainframe computer.

In an exemplary embodiment, in terms of hardware architecture, as shown in FIG. 7, the computer 701 includes one or more processors 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

The memory 710 may include multiple logical partitions (LPARs) 712, each running an instance of an operating system. The LPARs 712 may be managed by a hypervisor, which may be a program stored in memory 710 and executed by the processor 705.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute instructions stored within the memory 710, to communicate data to and from the memory 710, and to generally control operations of the computer 701 pursuant to the instructions.

Systems and methods according to this disclosure may be embodied, in whole or in part, in computer program products or in computing device 700, such as that illustrated in FIG. 7.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method, comprising:
    detecting, by an agent of a remote debugging tool, that a first controller currently associated with the agent for a debugging session has not responded to a status inquiry from the agent, wherein:
        the first controller interacts with an end user, sends requests to the agent to operate a target program, and processes responses from the agent; and
        the agent and the target program execute on the same node, the agent controls operation of the target program, and the agent executes commands according to the requests from the first controller and sends the responses to the first controller; and
    performing by the agent, based on detecting that the first controller has not responded to the status inquiry from the agent:
        identifying a second controller;
        associating the second controller with the agent for the debugging session, the associating including synchronizing a debugging session state between the second controller and the agent; and
        resuming the debugging session with the second controller in place of the first controller,
        wherein the target program continues to execute during the performing, and the debugging session state is not changed by the performing.

2. The method of claim 1, wherein the agent and the target program are executed by the same operating system (OS).

3. The method of claim 1, wherein the first controller and the second controller are located on different nodes.

4. The method of claim 1, wherein the first controller interacts with the end user via a graphical user interface (GUI).

5. The method of claim 1, wherein input to the synchronizing includes controller debug session state data maintained by the first controller.

6. The method of claim 1, wherein input to the synchronizing includes agent debug session state data maintained by the agent.

7. The method of claim 1, wherein contents of the debugging session state are updated to include contents of the requests and responses.

8. The method of claim 1, wherein the remote debugging tool is provided as a service in a cloud environment.

9. A system, comprising:
a memory having computer readable instructions; and
a processor for executing the computer readable instructions, the computer readable instructions including:
detecting, by an agent of a remote debugging tool, that a first controller currently associated with the agent for a debugging session has not responded to a status inquiry from the agent, wherein:
the first controller interacts with an end user, sends requests to the agent to operate a target program, and processes responses from the agent; and
the agent and the target program execute on the same node, the agent controls operation of the target program, and the agent executes commands according to the requests from the first controller and sends the responses to the first controller; and
performing by the agent, based on detecting that the first controller has not responded to the status inquiry from the agent:
identifying a second controller;
associating the second controller with the agent for the debugging session, the associating including synchronizing a debugging session state between the second controller and the agent; and
resuming the debugging session with the second controller in place of the first controller,
wherein the target program continues to execute during the performing, and the debugging session state is not changed by the performing.

10. The system of claim 9, wherein the agent and the target program are executed by the same operating system (OS).

11. The system of claim 9, wherein the first controller and the second controller are located on different nodes.

12. The system of claim 9, wherein input to the synchronizing includes controller debug session state data maintained by the first controller.

13. The system of claim 9, wherein input to the synchronizing includes agent debug session state data maintained by the agent.

14. The system of claim 9, wherein contents of the debugging session state are updated to include contents of the requests and responses.

15. The system of claim 9, wherein the remote debugging tool is provided as a service in a cloud environment.

16. A computer program product comprising a computer readable storage medium having program instructions embodied therewith, the program instructions executable by a processor to cause the computer processor to perform:
detecting, by an agent of a remote debugging tool, that a first controller currently associated with the agent for a debugging session has not responded to a status inquiry from the agent, wherein:
the first controller interacts with an end user, sends requests to the agent to operate a target program, and processes responses from the agent; and
the agent and the target program execute on the same node, the agent controls operation of the target program, and the agent executes commands according to the requests from the first controller and sends the responses to the first controller; and
performing by the agent, based on detecting that the first controller has not responded to the status inquiry from the agent:
identifying a second controller;
associating the second controller with the agent for the debugging session, the associating including synchronizing a debugging session state between the second controller and the agent; and
resuming the debugging session with the second controller in place of the first controller,
wherein the target program continues to execute during the performing, and the debugging session state is not changed by the performing.

17. The computer program product of claim 16, wherein the agent and the target program are executed by the same operating system (OS).

18. The computer program product of claim 16, wherein the first controller and the second controller are located on different nodes.

19. The computer program product of claim 16, wherein contents of the debugging session state are updated to include contents of the requests and responses.

20. The computer program product of claim 16, wherein the remote debugging tool is provided as a service in a cloud environment.

* * * * *